Figure 1:
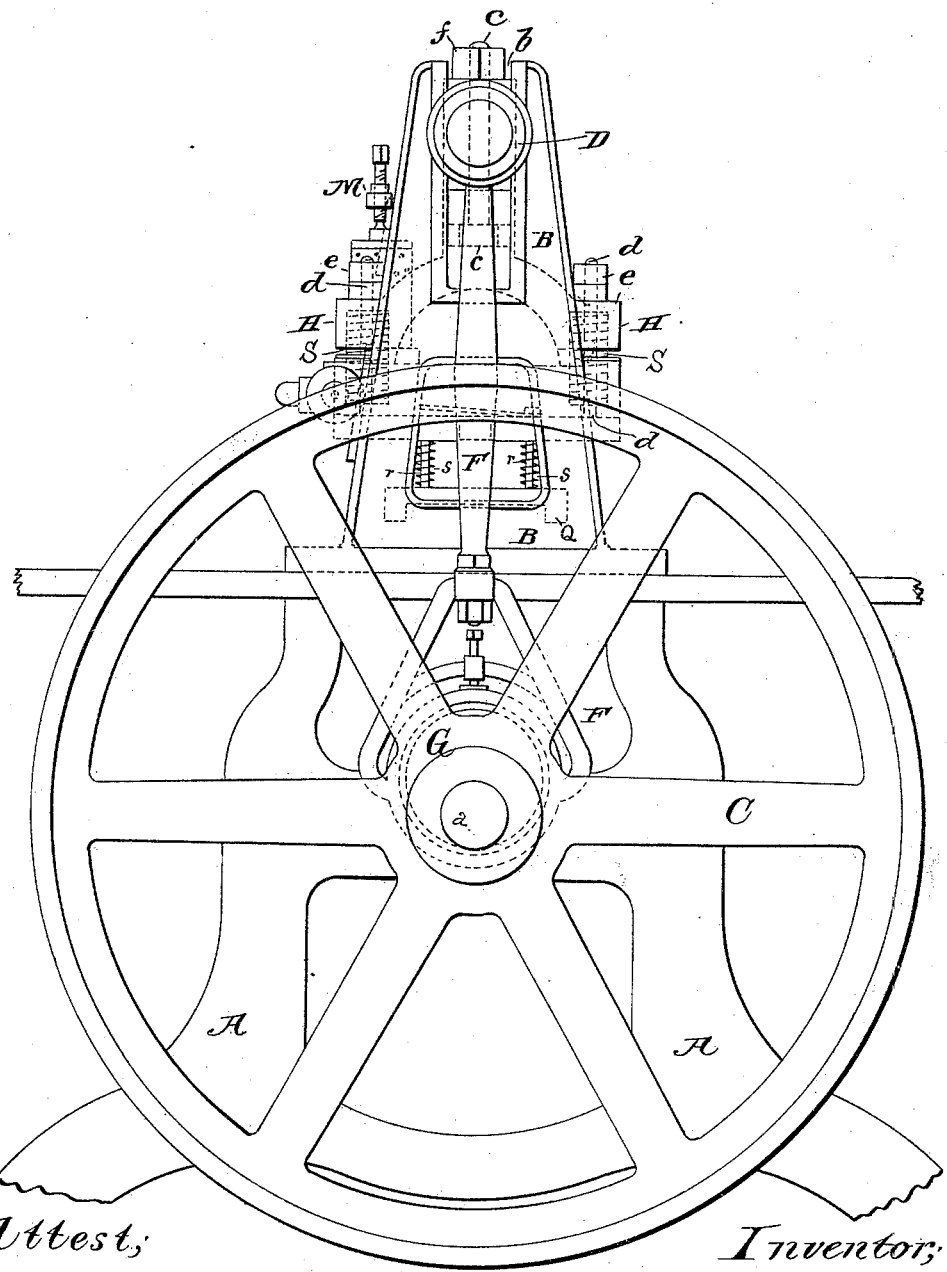

(No Model.) 3 Sheets—Sheet 1.
C. S. FOWLER.
CRACKER MACHINE.

No. 474,168. Patented May 3, 1892.

Attest;
C. W. Benjamin
J. Kennedy

Inventor;
Chas. S. Fowler
by W. P. Preble Jr
his attorney (No Model.)  3 Sheets—Sheet 2.
C. S. FOWLER.
CRACKER MACHINE.

No. 474,168.  Patented May 3, 1892.

Attest,
C. M. Benjamin.
J. Kennedy.

Inventor,
Chas S. Fowler
by W. P. Preble Jr
his Atty.

(No Model.)  3 Sheets—Sheet 3.
C. S. FOWLER.
CRACKER MACHINE.
No. 474,168. Patented May 3, 1892.
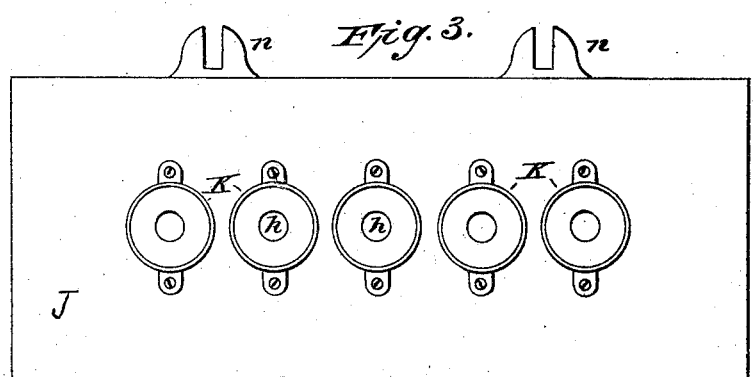
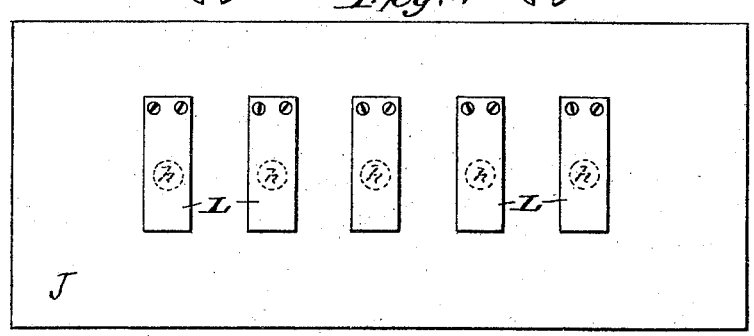
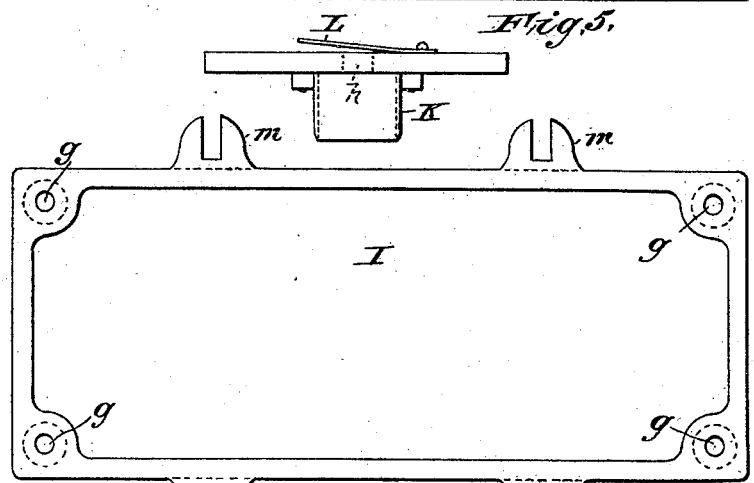

UNITED STATES PATENT OFFICE.

CHARLES S. FOWLER, OF BROOKLYN, NEW YORK.

CRACKER-MACHINE.

SPECIFICATION forming part of Letters Patent No. 474,168, dated May 3, 1892.

Application filed March 2, 1892. Serial No. 423,443. (No model.)

*To all whom it may concern:*

Be it known that I, CHARLES S. FOWLER, a citizen of the United States, and a resident of the city of Brooklyn, county of Kings, and State of New York, have invented certain new and useful Improvements in Cracker-Machines, of which the following is a specification.

My invention relates to that class of machinery in which a sheet of dough or similar material is fed from a suitable source of supply under a cutting-plate provided with one or more cutters, the cut crackers and scrap being afterward conveyed away out of the path of the cutters; and it relates more particularly to the cracker-cutting mechanism which forms what may be called the "middle third" of a cracker-machine, the feeding mechanism constituting the first third of the machine, and the removing mechanism the last third.

I have not considered it necessary to illustrate what I have called the "first" and "last" thirds of a cracker-machine, as their structure and use is well known to persons familiar with such machinery.

In this class of machinery the cutters are arranged on the under side of a plate, which is situated at right angles to the line of travel of the sheet of dough and is made to reciprocate vertically, alternately cutting through said sheet as the dough passes under the cutter and leaving the dough thus cut in the form of crackers and scrap on the endless apron on which the dough is fed to be carried forward to the removing mechanism, where the scrap is separated from the crackers in the usual way. As the motion of the dough-feeding apron is intermittent where reciprocating cutters are employed, and as the latter move very rapidly some means of discharging the cut crackers from the cutters with as much or greater rapidity and precision has to be provided to prevent the crackers and scrap from interfering with each other and thereby preventing the proper action of the machine. In the class of machinery to which my invention relates this discharge of the crackers from the cutters is accomplished by the use of compressed air.

My invention consists in providing such a machine with devices for enabling the blast of compressed air to work with greater certainty and speed, for diminishing the strain and jar caused by the impact of the cutters on the cutting-plate, and for enabling the cutters to be removed from the machine and replaced by others more readily than has heretofore been the case.

Figure 2:
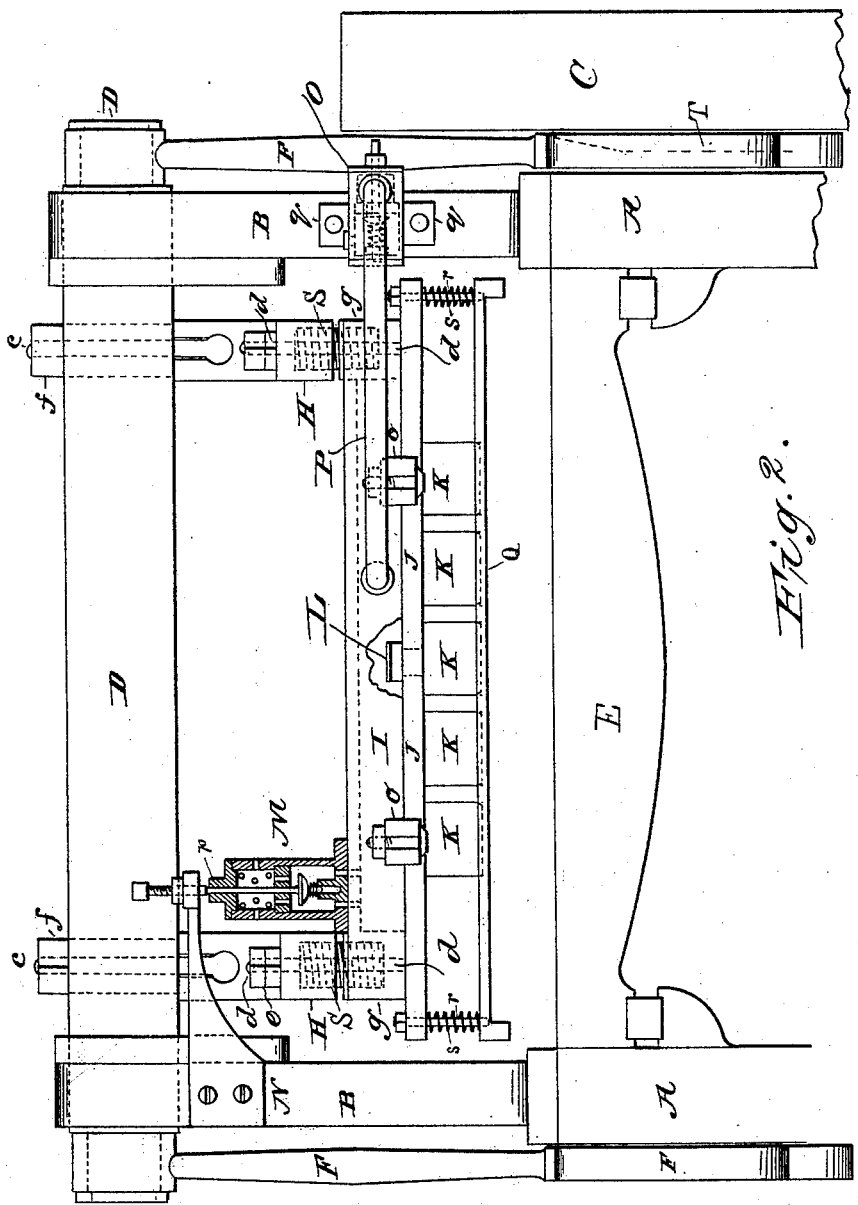

In the accompanying drawings, Figure 1 is a side elevation showing the cracker-cutting mechanism. Fig. 2 is a view of the cracker-cutting apparatus at right angles to Fig. 1. Fig. 3 shows the under side of the cutter-plate. Fig. 4 is a top view of the cutter-plate. Fig. 5 is a detail of one of the cutters with its valve. Fig. 6 represents the base of the air-box over the cutter-plate.

The same letters indicate similar parts in the different drawings.

A is the frame-work of the machine, supporting the uprights or standards B.

C is the fly-wheel, which operates the entire machine and is mounted upon a suitable shaft $a$, journaled in the frame-work A and driven by belting. (Not shown.) The dough-feeding mechanism (not shown) is situated at the right of the apparatus shown in Fig. 1 and the removing mechanism (not shown) is situated at the left of the apparatus shown in Fig. 1, the frame-work A being extended to the right and left sufficiently to support said dough-feeding and removing mechanism.

D is a vertically-reciprocating bar or crosshead fitted in the slots $b$ of the standards B.

E is the cutting-plate.

The up-and-down movement of the crosshead D is produced by the eccentric-rods F, the upper ends of which are secured to the bar D, as shown in Fig. 2, and the lower ends of which are operated by the eccentric-cam G on the shaft $a$ in the usual manner, each revolution of the wheel C and shaft $a$ causing the eccentric-rods to make one up and one down stroke under the operation of the eccentric cam.

The reciprocating bar D carries what may be called as a whole the "cutter-head," which moves up and down with the reciprocating bar D into and away from contact with the dough-carrying apron. This cutter-head is rigidly connected to the bar D by the two yokes H, the center of which is bolted to the bar by the bolts c and the nuts f, and the branches of which are bolted by means of the bolts d and nuts e to the corners of the air-box I. (See Fig. 6.)

The air-box I is of sufficient extent to cover the tops of all the cutters. The details of its construction will be described presently.

The cutter-plate J is provided on its under surface with a number of hollow cutters K, each one of which has an opening at the top h, Figs. 3 and 4, which extends through the cutter-plate J, and over which is secured the spring-valve L, Figs. 4 and 5. The cutter-plate J is detachably connected with the base of the air-box I by screw-bolts o, joining the lugs m, projecting from the air-box with the lugs n, projecting from the cutter-plate. The air-box is supplied at the proper time with air through the pipe P, one end of which enters the hole in the side of the box and the other end of which connects with the valve O, attached to one of the standards B by the bracket q and connected with a suitable reservoir of compressed air. (Not shown in the drawings.) Communication between this valve-box and the pipe P is normally closed, but is automatically opened by a cam T, (shown by dotted lines in Fig. 2,) fastened on the rim of the fly-wheel C and striking against the projecting valve at every revolution of said wheel C. A relief-valve M is provided, preferably, on top of the air-box I, as shown in Fig. 2, which valve is normally closed, but is opened as the air-box rises by causing the valve-stem p to strike against the projecting arm N rigidly secured to the upright B in the path of the valve. Any kind of valve may be employed instead of that shown, provided it is automatically opened each time the box I rises. Thus far there is nothing new in the apparatus above described, except arranging the cutter-plate so that it can be readily detached from the machine without at the same time removing the air-box or any other heavy part, and, second, in providing a relief-valve for the air-box automatically opened by the motion of the box.

I have also introduced a new means of protecting the machine from the jar caused by the striking of the cutter-plate J in its descent. This consists in hollowing out the branches of the yokes on the under sides and also the upper part of the corners g of the air-box frame and placing strong spiral springs in the openings thus made around the bolts d, which connect the yokes and the air-box together, leaving sufficient space between the surfaces of the yokes and the air-box to permit of a limited action of the springs. Suspended below the cutter-plate J is the perforated clearing plate or stripper Q, attached at the four corners by the bolts r, surrounded by the spiral springs s, and serving to prevent the scrap from being lifted through adhesion to the outside of the hollow cutters.

The necessity for the devices which I have referred to as constituting my invention arises as follows: The valves L, which close the top of the individual cutters are preferably of flat spring-brass and are normally open. When a charge of compressed air is admitted to the air-box through the pipe P to blow out the crackers, the pressure of said compressed air, as soon as it has blown the crackers from the cutters, closes said valve, the pressure upon them being strong enough to keep them closed long enough for the cutter to make another stroke. As a blast of compressed air is admitted to the air-box at every revolution of the fly-wheel, it is manifest that the valves would remain constantly closed in spite of the resilient force of the spring unless the pressure of the air in the box is diminished nearly or quite to that of the normal atmosphere. This is brought about by providing a suitable valve communicating with the outside atmosphere and automatically opened at some time during the ascent or descent of the air-box to allow the compressed air to escape and for said relief-valve to be closed again before it is time for the next blast of air to be let into the air-box. The valves L being open at the instant when the cutter-plate and air-box begin their upward motion and the valve M being closed, the charge of compressed air which is admitted through the pipe P by the action of the cam T opening the valve-box O, rushes into the hollow cutters and blows out the crackers therein, at once closing the valve L of each cutter from which the cracker is blown. Should the cracker in any cutter for any reason exert unusual resistance to being blown out, its corresponding valve L will not close immediately, and, therefore, the whole force of the charge of compressed air becomes directed against the cracker in that special resisting cutter. This cracker then being blown out its corresponding valve L closes, and by the time the air-box and cutter-plate have reached the top of their upward stroke the valve M is automatically opened and the compressed air in the box I is allowed to escape thereby. Thus when the air-box and cutters descend the air in the box I is only under the normal atmospheric pressure, the valves L opening automatically by their resilient force. Without this relief-valve M or some equivalent means of restoring the air in the box I to its normal atmospheric pressure, the residue of the charge of compressed air after blowing out the crackers would resist the opening of the valves L, and hence the cutters would fill up with dough on account of there being no force to expel the dough when cut.

The utility of what may be called the "spring-buffers"—namely, the spiral springs S, and the hollowing out of the yokes H and the corners g of the air-box in preventing or very largely diminishing the noise and jar of the machine in operation—would seem to be obvious without further information.

The utility of making the cutter-plate detachable by itself, so that the cutter-plate J and the perforated clearing-plate Q, which are comparatively light, can be removed and the cutters replaced by others is manifest, as compared with the old method of removing the entire cutter-head by detaching the bolts c, connecting the yokes to the vertically-reciprocating bar.

The operation of a cracker-machine with my improvements embodied therein is substantially the same as that of other cracker-machines, except in the particulars pointed out.

I claim—

1. In a cracker-machine, an air-box, cutters therein, valves L, connected therewith, a compressed-air reservoir connected by suitable valve with said air-box, and a relief-valve M, opening out of said air-box and automatically opened by said box in its reciprocating motion, and with mechanism for causing said air-box to reciprocate in unison with the plate carrying said cutters, substantially as shown, and for the purposes specified.

2. A cracker-machine provided with a vertically-reciprocating bar, yokes rigidly attached thereto, the under side of each branch of which yokes is hollowed out to receive the upper end of a spiral spring, an air-box, the upper side of each corner of which is similarly hollowed out to receive the lower end of said spiral spring, and a spiral spring set in each of said hollowed-out yokes and corners around the bolts connecting said yokes with said air-box, substantially as shown and described.

CHARLES S. FOWLER.

Witnesses:
W. P. PREBLE, Jr.,
J. KENNEDY.